Patented Aug. 4, 1953

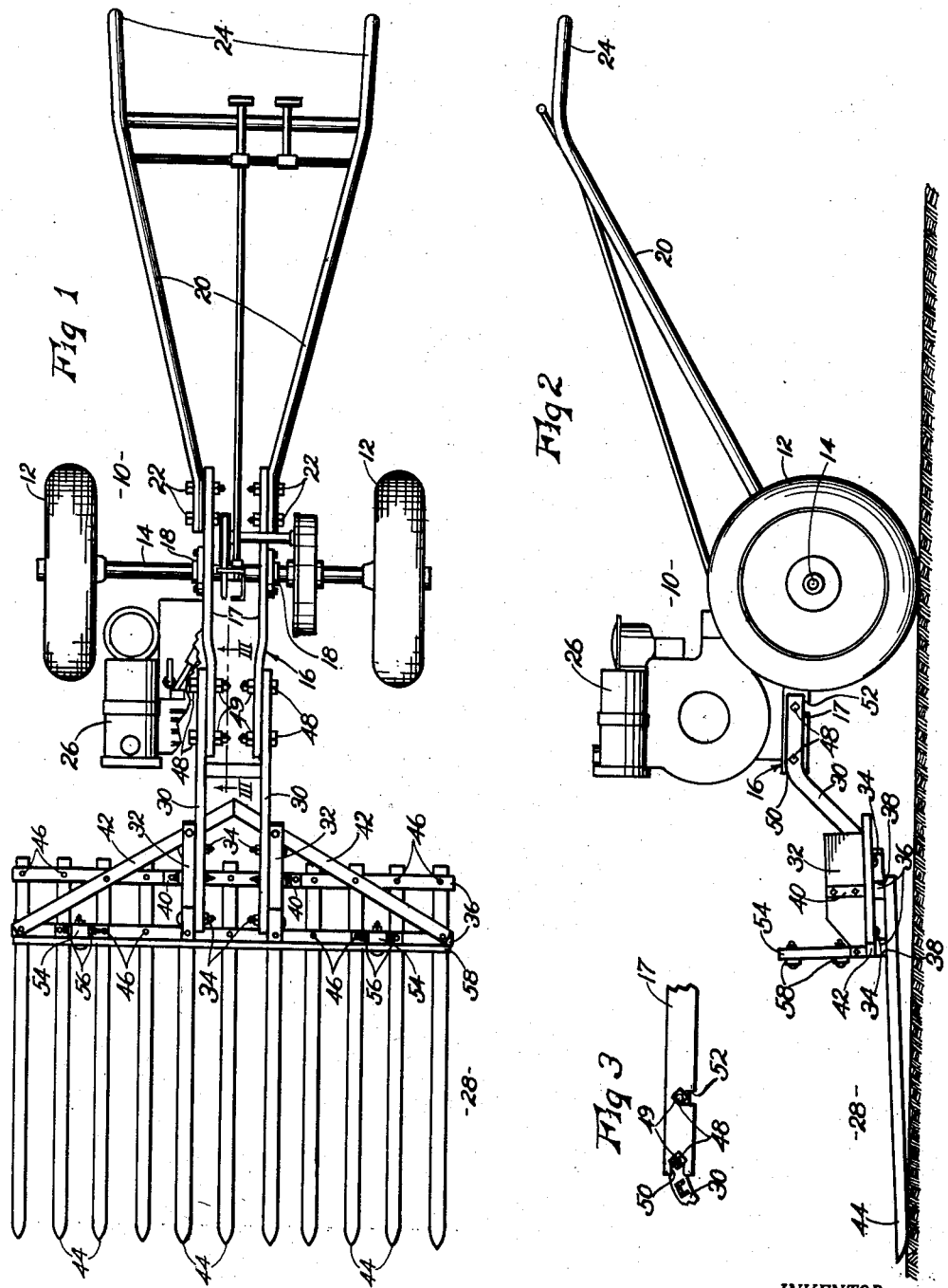

2,647,356

UNITED STATES PATENT OFFICE 2,647,356

POWER-OPERATED PUSH RAKE

Johnny Lee Adams, Independence, Mo.

Application May 21, 1951, Serial No. 227,390

1 Claim. (Cl. 56—400.14)

This invention relates to improvements in push rakes adapted for use on hand operated power driven tractors.

The principal object of my invention is to provide a push rake that is primarily designed for use in combination with a hand operated power tractor, and that is so attached to the power tractor that the operator can easily lower the rake teeth into a hay gathering position and raise the rake into a hay carrying position.

Another object of my invention is to provide a push rake which is rigidly interconnected with the handles of the power tractor and rotatably carried by the axle of the power tractor, so that the operator can easily raise and lower the rake teeth to avoid running them into irregularities of the ground surface.

Still another object of my invention is to provide a push rake which can be easily and quickly detached from the garden tractor when its use is no longer desired.

Other objects of my invention are simplicity and economy of manufacture, ruggedness, and ease of operation.

With these objects in view, as well as others which will appear in the course of the specification, reference will be had to the drawing, wherein:

Fig. 1 is a plan view of a push rake assembly embodying the present invention, partially broken away.

Fig. 2 is a side elevational view of the assembly shown in Fig. 1.

Fig. 3 is a fragmentary view taken on line III—III of Fig. 1.

Like numerals refer to similar parts throughout the several views and the numeral 10 refers to a garden tractor having a pair of wheels 12 interconnected by axle 14 and frame 16 rotatably carried by said axle.

Said frame is disposed above axle 14 in a substantially horizontal plane and is rotatably carried on said axle by means of bearings 18. Said frame includes a pair of spaced apart bars 17 extending forwardly and rearwardly from said axle.

Handle bars 20 are rigidly attached to the rearward end of bars 17 by means of bolts 22. Said handle bars extend rearwardly and upwardly from said frame and are formed at their rearward end to present handles 24 at a convenient height for the operator.

A suitable motor 26, adapted to propel said garden tractor, is carried by frame 16 and is disposed above said frame and forwardly from axle 14.

Numeral 28 refers to a push rake assembly which is adapted to be removably attached to the forward end of bars 17 and which extends forwardly from said garden tractor. Said push rake may be constructed of any suitable material such as wood, steel, or aluminum.

Said push rake assembly comprises a pair of spaced apart support bars 30, preferably made of metal, adapted to be received adjacent the outer sides of bars 17 included in frame 16. Said support bars extend forwardly and downwardly from said frame and are rigidly attached at their forward ends to a pair of vertically disposed plates 32 by means of bolts 34. A pair of transverse bars 36 are attached to plates 32 and disposed in notches 38 formed in the lower side of said plates. The rearward bar 36 is attached to plates 32 by means of angle straps 40.

A pair of brace members 42 are attached at their outer ends to the outer ends of the forward transverse bar 36 and extend rearwardly and inwardly to a point adjacent the rearward end of plates 32 where they are attached together. Plates 32 are notched at their rearward ends to receive said support members. Said support members add additional strength to the push rake assembly.

A plurality of teeth 44 are attached at their rearward ends beneath transverse bars 36 by means of screws or bolts 46 and extend forwardly equidistantly. The forward ends of teeth 44 are pointed to facilitate loading of the push rake assembly. The lower sides of teeth 44 present a smooth surface to further facilitate pushing the push rake assembly beneath a load such as a haystack.

A pair of bolts 48 are carried in spaced apart relation in the rearward end of each of support bars 30 and project inwardly therefrom. Notch 50 is formed in the forward end of each bar 17 and notch 52 is formed in the lower edge of said bar in spaced relation from the forward end thereof. Notches 50 and 52 are disposed to receive bolts 48 for removably attaching push rake assembly 28 to garden tractor 10. In attaching the bars 30 to frame 16 the push rake is raised slightly at its forward end and rearward bolts 48 are slid under frame 16 until they engage notches 52 and forward bolts 48 engage notches 50. Bars 30 may then be secured in this position by tightening nuts 49 provided for bolts 48. This attaching means results in a rigid connection between the push rake and the garden tractor but a connection which permits easy removal of the push rake. However, any type of attaching means may be used which will give a rigid connection.

Posts 54 are attached to the forward transverse bar 36 by means of angle straps 56 and extend perpendicularly upwardly therefrom to a suitable height. A plurality of guard rails 58 are attached to said posts and extend the full width of teeth 44.

Push rake assembly 28 is so disposed when attached to the garden tractor, that the teeth 44 are inclined upwardly to the rear, thus making the device more adaptable to uneven terrain. The lower edges of teeth 44 are rounded at their forward ends to prevent gouging them into the ground surface.

In the operation of my device the push rake can be placed in a loading position by lifting up on handle bars 20, thus lowering the forward ends of teeth 44 to the ground. The tractor can then be driven forward until the desired load is in place above teeth 40. The load may then be raised to a carrying position by pushing downwardly on the handles 24. During the carrying, the load will be held against slipping rearwardly by guard rails 58. The leverage obtained about axle 14 by means of the rearwardly extending handle bars makes it easy to carry a relatively heavy load with this push rake.

Having fully described my invention what I claim is:

In combination with a motor driven garden tractor having ground-engaging wheels interconnected by an axle and a frame carried rotatably by said axle intermediate said ground-engaging wheels said frame including a pair of horizontally disposed, spaced apart bars, a push rake including a pair of support bars, raking means comprising vertically disposed plates attached to the forward ends of said support bars, a pair of bars carried by said plates and disposed transversely to said plates, a plurality of teeth fixed beneath said transverse bars and extending forwardly therefrom, a guard rail carried by said transverse bar and disposed upwardly therefrom, means for removably attaching said support bars to said frame bars, said attaching means comprising a pair of longitudinally spaced apart bolts carried in the rearward end portion of each of said support bars, the foremost of said bolts being engaged in a slot formed in the forward end of each of said frame bars, and the rearmost of said bolts being engaged in a slot formed on the lower edge of each of said frame bars in spaced relation from the forward end thereof, and handle bars rigidly attached to the rearward ends of said frame bars and extending rearwardly and upwardly therefrom, whereby said push rake attachment may be manually lowered into loading position or raised to a carrying position.

JOHNNY LEE ADAMS.

References Cited in the file of this patent

UNITED STATES PATENTS

| Number | Name | Date |
| --- | --- | --- |
| 736,878 | Reis | Aug. 18, 1903 |
| 1,846,507 | Boring | Feb. 23, 1932 |
| 2,268,250 | Gormley et al. | Dec. 30, 1941 |
| 2,271,591 | Hickman | Feb. 3, 1942 |

FOREIGN PATENTS

| Number | Country | Date |
| --- | --- | --- |
| 95,802 | Switzerland | Aug. 1, 1922 |